(12) United States Patent
Barnett

(10) Patent No.: US 6,772,826 B1
(45) Date of Patent: Aug. 10, 2004

(54) THERMAL ENERGY HEAT EXCHANGER

(76) Inventor: Karl Vernon Lee Barnett, Apt. 11-K, Ascension Dr., Asheville, NC (US) 28806

(*) Notice: Subject to any disclaimer, the term of this patent is extended or adjusted under 35 U.S.C. 154(b) by 709 days.

(21) Appl. No.: 09/710,140

(22) Filed: Nov. 9, 2000

Related U.S. Application Data

(63) Continuation of application No. 09/285,313, filed on Apr. 2, 1999, now abandoned.

(51) Int. Cl.[7] .......................... F25D 23/12; F25D 23/02
(52) U.S. Cl. .......................... 165/47; 165/73; 165/75; 165/134.1; 62/238.6; 62/238.7; 62/259.1; 62/506; 62/507; 62/508
(58) Field of Search .............................. 165/47, 73, 75, 165/134.1; 62/238.6, 238.7, 508, 96, 99, 506, 507, 259.1; 237/2 B

(56) References Cited

U.S. PATENT DOCUMENTS

| | | | | |
|---|---|---|---|---|
| 3,427,005 A | * | 2/1969 | Kuykendall | |
| 3,584,466 A | * | 6/1971 | Kaufman | 62/183 |
| 4,005,583 A | * | 2/1977 | Ramey | |
| 4,030,312 A | * | 6/1977 | Wallin et al. | |
| 4,188,994 A | * | 2/1980 | Hinshaw | 165/61 |
| 4,204,409 A | * | 5/1980 | Satama | |
| 4,261,418 A | * | 4/1981 | Helt et al. | |
| 4,305,260 A | * | 12/1981 | Backlund | 62/238.6 |
| 4,317,334 A | * | 3/1982 | Burgess | 62/508 |
| 4,353,219 A | * | 10/1982 | Patrick, Jr. | |
| 4,383,419 A | * | 5/1983 | Bottum | 62/238.6 |
| 4,479,365 A | * | 10/1984 | Holmes | |
| 4,505,327 A | * | 3/1985 | Angle et al. | 237/2 B |
| 4,558,571 A | * | 12/1985 | Yoshinaga et al. | 62/238.6 |
| 4,569,207 A | * | 2/1986 | James | |
| 4,612,778 A | * | 9/1986 | Medrano | |
| 4,653,287 A | * | 3/1987 | Martin, Jr. | |
| 4,805,689 A | * | 2/1989 | Inada et al. | 62/238.7 |
| 4,815,530 A | * | 3/1989 | Scott | |
| 4,907,418 A | * | 3/1990 | DeFazio | |
| 4,947,930 A | * | 8/1990 | McCrary | 62/238.6 |
| 5,058,392 A | * | 10/1991 | Jouan et al. | |
| 5,069,043 A | * | 12/1991 | Wachs, III et al. | |
| 5,117,656 A | * | 6/1992 | Keck et al. | 62/508 |
| 5,158,486 A | * | 10/1992 | Tamame | |
| 5,311,747 A | * | 5/1994 | Pringle et al. | |
| 5,471,851 A | * | 12/1995 | Zakryk | |
| 5,553,463 A | * | 9/1996 | Pointer | 62/238.6 |
| 5,701,748 A | * | 12/1997 | Phelps et al. | |
| 5,901,563 A | * | 5/1999 | Yarbrough et al. | |
| 6,170,281 B1 | * | 1/2001 | Barnett | 62/259.1 |
| 6,196,010 B1 | * | 3/2001 | Mohrman | 62/508 |
| 6,430,954 B1 | * | 8/2002 | Smith | |

FOREIGN PATENT DOCUMENTS

| | | | | |
|---|---|---|---|---|
| DE | 3024704 | * | 1/1982 | 62/238.6 |
| JP | 0020641 | * | 2/1978 | 62/508 |
| JP | 1-225845 | * | 9/1989 | |
| JP | 404283329 | * | 10/1992 | 62/238.6 |
| JP | 6-201223 | * | 7/1994 | |

* cited by examiner

Primary Examiner—John K. Ford

(57) ABSTRACT

A Thermal Energy Heat Exchanger, is an air conditioning system, for the exterior unit of a fully assembled and installed heat pump and, or, air conditioning system, by means of a water refrigerant, from a source of water, such as, but not limited to a river, a lake, a pond, a swimming pool, a well, a creek, or an ocean; wherein a flow of water is circulated from the source of water by means of a water pumping device, 25A, under a controlled water pressure 25B, through an intake system of piping 25C, to a plurality of evaporator coils, positioned so as to surround the exterior unit by means of attachment to the inner chamber section of a protective cover enclosure, and through the plurality of evaporator coils, to an Outlet water disposal piping system, 25D; being in effect a heat pump and, or, air conditioner for the exterior unit of a fully assembled and installed heat pump and, or, air conditioning system, by means of a water refrigerant.

10 Claims, 3 Drawing Sheets

AIR INTAKE

AIR INTAKE

THERMAL ENERGY HEAT EXCHANGER

CROSS-REFERENCE TO RELATED APPLICATION (IF ANY)

The following information, is to provide a reference to previously filed non-provisional patent application:

1) The Weather Shield Solar Heat Collector per Reflector
   A) application Ser. No. 09/261,310, now U.S. Pat. No. 6,170,281
   B) Filing Date—Mar. 2, 1999
   C) The relationship of the application(s), is as follows;

The invention, the weather shield solar heat collector per reflector, is a previously filed non-provisional application, with application Ser. No. 09/261,310; wherein, the present invention, the Thermal Energy Heat Exchanger is attached to the inner chamber section of the solar heat side panels of the weather shield of Ser. No. 09/261,310 and that the present invention is a novel and unique Add-On to the said weather shield.

2) The Thermal Energy Heat Exchanger:
   A) application Ser. No. 09/285,313, now abandoned
   B) Filing Date—Apr. 2, 1999
   C) The relationship of the application(s), is as follows;

The Present Application is a continuation of the previously filed patent application of Ser. No. 09/285,313 filed Apr. 2, 1999, now abandoned.

STATEMENT AS TO RIGHTS TO INVENTIONS MADE UNDER FEDERALLY-SPONSORED RESEARCH AND DEVELOPMENT (IF ANY)

None.

BACKGROUND OF THE INVENTION

1. Field of the Invention

This invention relates to the heating and, or, air conditioning technical field, as pertains to the use of solar heat recovery or reflection, the control of air circulation, and the heat exchange recovery of thermal energy, by means of a heat exchange effect with the exterior unit of a heat pump and, or, air conditioning system.

The subject matter of the claimed invention is centered around the said exterior unit, the function of which is to act as the heart, veins, lungs, and soul of said system, having a compressor that pumps, by means of tubing thru the air circulation system of the heat exchange coils, fed by a forced air fan.

2. Description of the Prior Art

The soul of the heating and cooling process center, is the said exterior unit heat exchange system, which is located outdoors in a harsh environment, with an unimpeded access of the weather elements of rain, snow, sleet, hail, wind, cold, and extreme heat, which drastically reduces the said heat exchange effect, by;

1) introducing moisture per water, directly into the said air circulation system, which interacts with cold unregulated winds to freeze-up the said tubing and reduces or totally stops air flow,
2) being illuminated daily by solar heat rays, which are either wasted during heat cycle season or endured as a burden to overcome during the cooling cycle season.

Where as, the use of said heat pumps and central air conditioning exterior units, have been plagued by continuous problems such as;

A) the lack of adequate weather protection,
B) the unavoidable placement, of said exterior unit, in weather conditions, which by nature are the total opposite of conditions needed for the optimal heating and cooling exchange functions of the FREON conduit, employed by said exterior unit's compressor, to transfer;
A) heat from a heat starved environment of the outdoors, through piping, into the indoors,
B) heat from the indoors, into a heat rich environment, of the outdoors, through said piping,
C) said heat, through forced air flow, by use of electric motors, into an already hot summer environment,
D) said heat, pick up from a cold winter environment to be transported indoors.

Further, references to specific problems involved in the prior art, are as follows:

A) College level, book of study, Refrigeration and Air Conditioning Technology, 2nd Edition by Whiman, Johnson, published by Delmar;
A) Page 799, chapter 45, section 25 reads as follows;

"The outdoor unit installation for a heat pump is much like a central air conditioning system from an air low standpoint. The unit must have a good air circulation around it, and the discharge air must not be allowed to recirculate.

There are some more serious considerations that should be dealt with. The direction of the prevailing wind in the winter could lower the heat pump performance. If the unit is located in a prevailing north wind or a prevailing wind from a lake, the performance may not be up to standard. A prevailing north wind might cause evaporation to operate at a lower than normal temperature. A wind blowing inland off a lake will be very humid and might cause freezing problems in the winter.

The outdoor unit must not be located where roof water will pour into it. The outdoor unit will be operating at below freezing much of the time, and any moisture or water that is not in the air itself, should be kept away from the unit's coils. If not, excess freezing will occur.

The outdoor unit is an evaporator in winter and will attract moisture from the outside air. If the coil is operating below freezing, the moisture will freeze on the coil. If the coil is freezing, the moisture will run off the coil as it does in an air conditioning evaporator. This moisture must have a place to go. If the unit is in a yard, the moisture will soak into the ground. If the unit is on a porch or walk, the moisture could freeze and create slippery conditions, FIGS. 45–30.

The outdoor unit is designed with drain holes or pans in the bottom of the unit to allow free movement of water away from the coil. If they are inadequate, the coil will become a solid block of ice in cold weather. When the coil is frozen solid, it is a poor heat exchanger with the outside air, and the C.O.P. will be reduced. Defrosting methods are discussed later."

So, you can see that a problem has existed for decades, with no design or consideration given for the control of the problem. The prior art solution has been, to;

1) move it to an area where hopefully the wind isn't as strong,
2) keep the outdoor unit away from falling water by locations,
3) drill holes in bottom to drain the unimpeded water flow,
B) Conclusion, the novelty of the unobvious approach taken by the inventor, is to go to the core of the problems, stop the water and wind from gaining access to the sensitive heat exchange coils of the exterior unit of a heat pump and, or, air conditioning system, by means of a protective cover enclosure of the patent application Ser. No. 09/261,310, now U.S. Pat. No. 6,170,281, by the same inventor; and the attachment of the evaporator coils of the present invention, to the inner chamber section of the said protective cover enclosure, so positioned as to surround the said exterior unit, while a water refrigerant is circulated through said present invention evaporator coils, in effect being an air conditioning system for an air conditioning system, by means of the heat exchange effect of the thermal energy within the water refrigerant being transferred to the said exterior unit, therefore increasing the cooling and, or, heating of a conditioned living space by use of thermal energy.

This invention is definitely an improvement, to the prior art, as relates to the said exterior units of heat pumps and air conditioning systems!

SUMMARY OF THE INVENTION

The present invention relates to a novel method and manner of creating a temperature change within the conditioned space by the unique positioning of evaporator coils to the inner chamber section of the side panels of the weather shield and solar heat collector per reflector, application Ser. No. 09/261,310, now U.S. Pat. No. 6,170,281.

It is an object of the present invention to recover thermal energy from a source of water, by passing said water, by means of pumping, through piping, tubing, or hose, through said evaporator coils.

A novel feature of the present invention is the heat exchange effect, created by the fan forced air, of the exterior unit of a heat pump and, or, air conditioning system, passing said air through said evaporator coils of the present invention, recovering and then delivering thermal energy to the heat exchanger of said exterior unit. Said exterior unit, then delivers thermal energy into the conditioned space, creating a temperature change.

Another novel feature of the thermal energy heat exchanger is that the present invention is an air conditioning system, for, an air conditioning system, built within a protective enclosure to completely surround the exterior unit of a heat pump and, or, air conditioning system, whereby the present invention does not intermingle within the said exterior unit's separate enclosure system.

BRIEF DESCRIPTION OF THE DRAWINGS

The following, is a list of all figures, by number, with corresponding statements explaining what each figure depicts.

a) Evaporator Coils, part(s) 20,21,22, and 23, b) flexible per easy access (screw on per screw off) hoses, part 24A and part 24B, c) intake or inlet water supply piping or tubing, part(s) 25, d) water pump with pressurization tank, part 25A, e) water regulation device, part 25B, and part 25E, f) intake or inlet water supply piping or tubing 25C, g) outlet or water disposal piping or tubing, part(s) 25D, h) labeling, with indicator lines of Air Intake positioning, D)

DESCRIPTION OF THE PREFERRED EMBODIMENTS

In simple terms, a Thermal Energy Heat Exchanger is an air conditioning system, for, an air conditioning system; being a machine similar in principle to a heat pump and, or, air conditioning system, of which the known function is to remove heat from the conditioned space, during the summer cooling season and recover heat from the outdoors to be transferred into the said conditioned space, in the winter heating season. A Thermal Energy Heat Exchanger is constructed so as to completely surround the exterior unit, of said heat pump and, or, air conditioning system, while delivering heat to said exterior unit in the winter and removing heat in the summer, by means of a water refrigerant, which creates a heat exchange effect, with said exterior unit.

Figure 1:
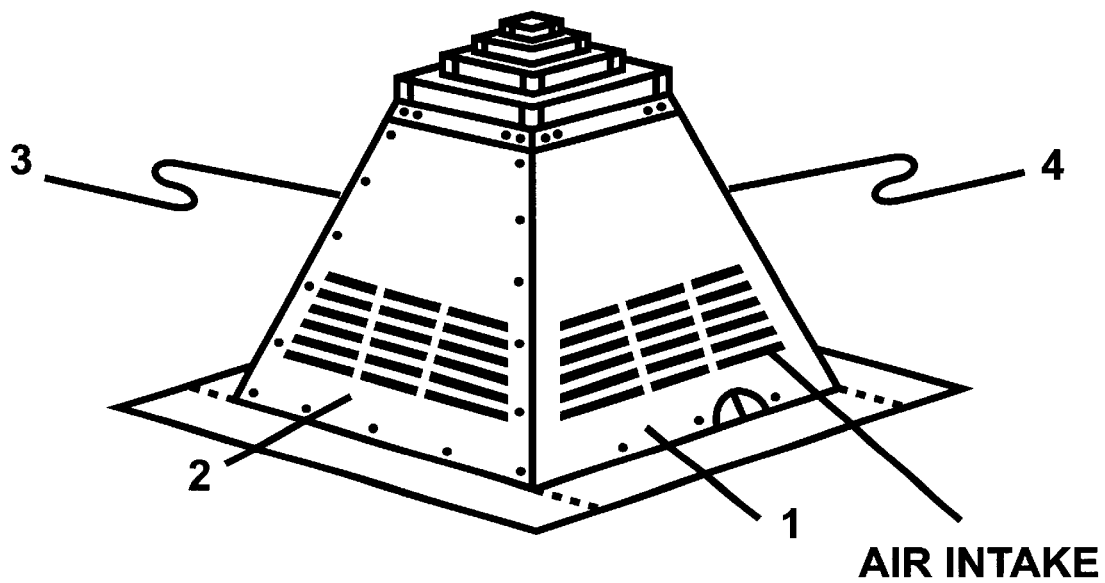
FIG. 1, depicts an exterior view of a fully assembled weather shield and solar heat collector per reflector, of U.S. Pat. No. 6,170,281, with the labeling of side panels 1,2,3, and 4, with numbered indicator lines, and with labeling of Air Intake, B)
Figure 2:
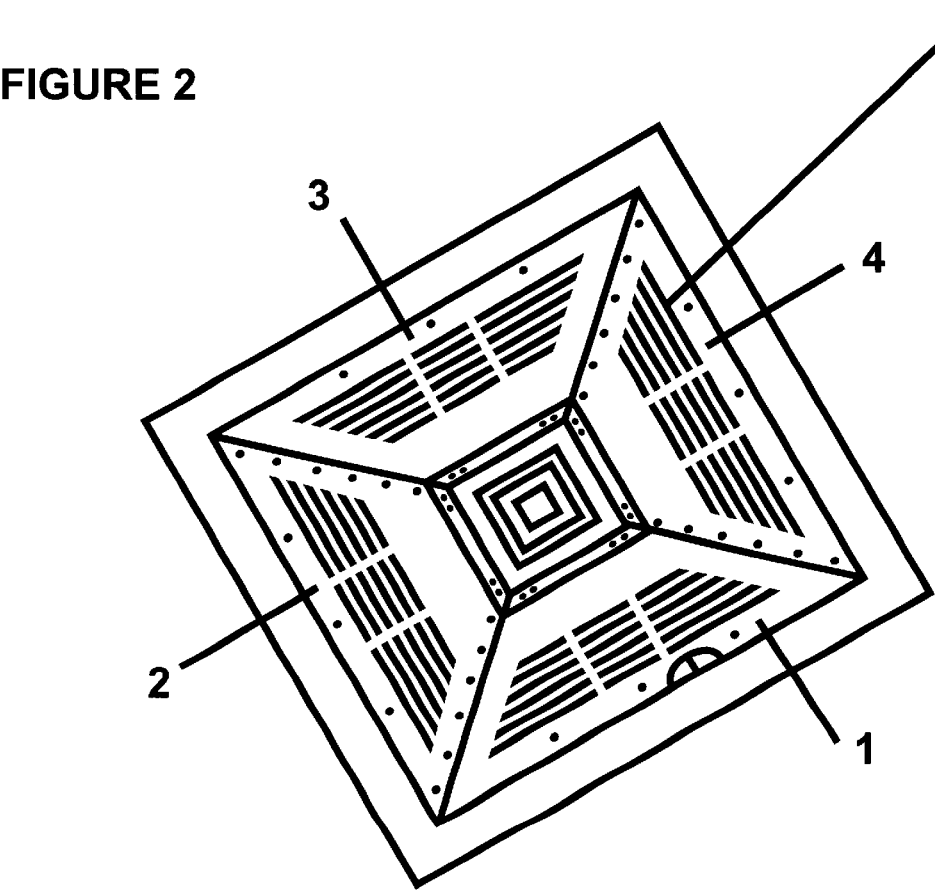
FIG. 2, depicts a top oversight view, of said weather shield, displaying a view of all sides of the invention, with the labeling of side panels 1,2,3, and 4, with numbered indicator lines, and with labeling of Air Intake, C)
Figure 3:
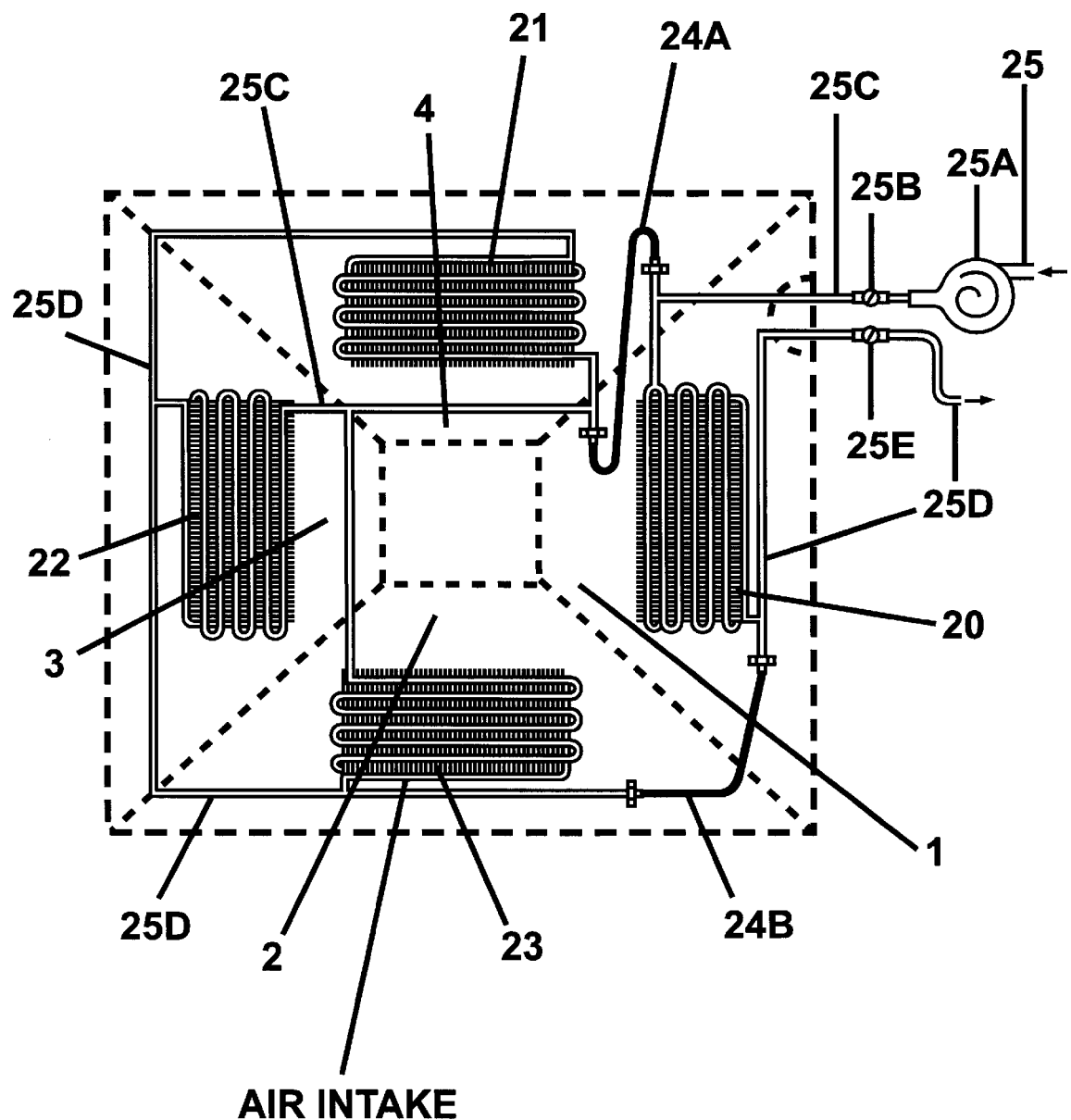
FIG. 3, depicts an enlarged top oversight, exposed view, (with dotted outline of said weather shield of U.S. Pat. No. 6,170,281), with the labeling of said panels 1,2,3, and 4, with the labeling of the following listed parts.
Figure 4:
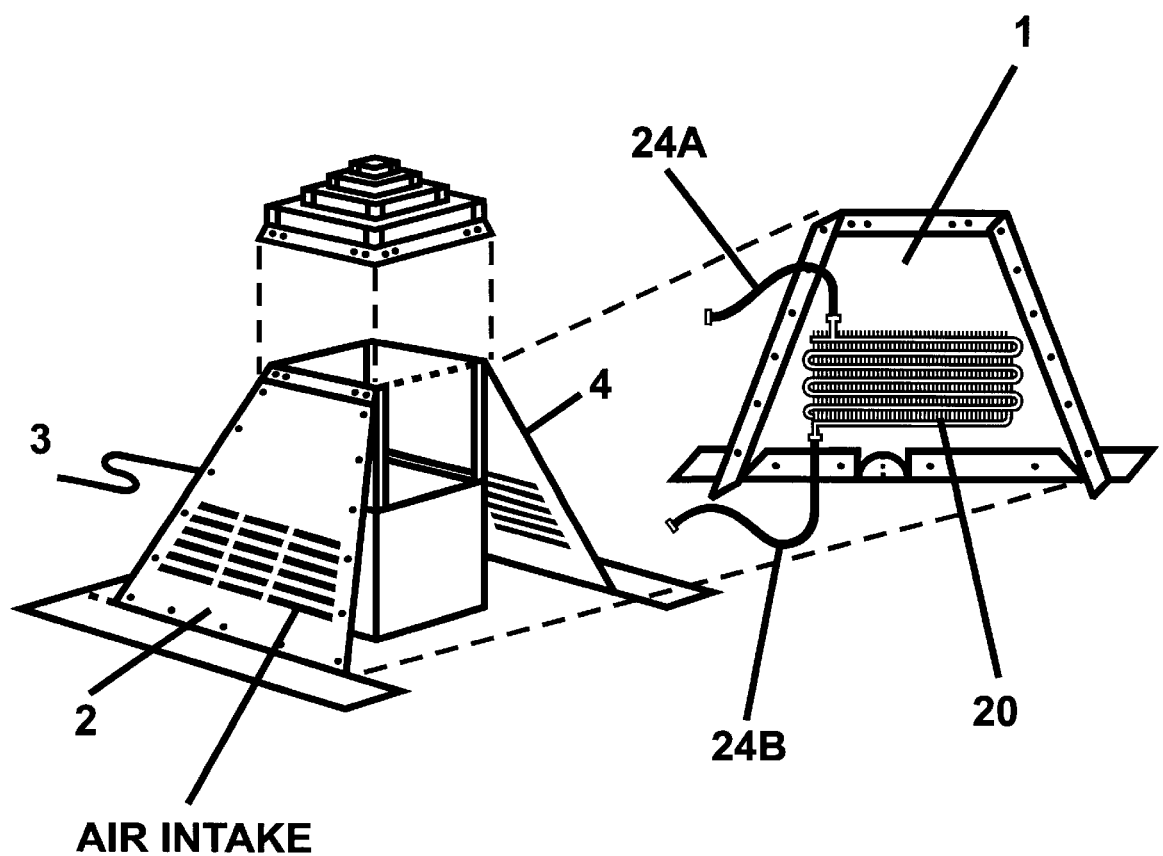
FIG. 4, depicts an exploded view of said weather shield, displaying the exterior unit of a heat pump and, or, air conditioning system, the inner chamber section of the side panels 1,2,3, and 4, the evaporator coil 20, with the hoses 24A and 24B displayed with numbered indicator lines.

The Thermal Energy Heat Exchanger, of the present invention, can be constructed by the following instructions;

A) A water pumping system can be constructed by any person with a knowledge of the plumbing technical field, assembling a pressurized water supply from a water source to the present invention, by use of the known conventional plumbing equipment, as is listed Here;

a) a water source b) an appropriate size and amount of water pipe part 25, per FIG. 3, such as, but not limited to galvanized pipe, copper pipe, rubber pipe, plastic pipe (P.V.C., C.P.V.C., etc) or any pipe material used by a plumbing technician or person with knowledge to assemble a water supply system, via piping from a source of water to the present invention, c) a water pump part 25A, per FIG. 3, with pressurization tank capacity to insure a constant pressure water supply to the present invention, d) a water regulator device part 25B, per FIG. 3, used by a plumbing technician or person with knowledge of the plumbing field to regulate and deliver a constant pressure of water supply, e) a water regulating device part 25E, per FIG. 3, to regulate water and maintain a constant water pressure, this part 25E is optional, present invention will function without part 25E, but does aid pressure control, B) The present invention, can be constructed by any person and, or, manufacture, with the knowledge of the Heating and Air Conditioning technical field by means of the following listed parts;

a) a protective cover, of sufficient size and shape as to completely surround the exterior unit of a heat pump and, or, air conditioning system, of the weather shield solar heat collector per reflector, by the same inventor, of U.S. Pat. No. 6,170,281, b) evaporator coils, parts 20,21,22, and 23, per FIG. 3; which are presently manufactured on a daily basis by manufacturers of the Refrigeration, Heat Pump, and Air Conditioning Field as an Evaporator Coil, for the movement of a liquid through tubing, with heat exchange capacity for the movement of air around said tubing in a known manufacturing techniques of constructing an Evaporator Coil, c) a flexible pipe part 24A, per FIG. 3, such as, but not limited to rubber, plastic, or synthetics, with screw on per screw off connectors for easy access installation of install or removal, a conventional washing machine rubber hose will be very similar, d) a flexible pipe, part 24B, e) pipe or tubing, part(s) 25C, per FIG. 3, f) pipe or tubing part(s) 25D, g) water regulating devices, part(s) 25B and 25E, C) The present invention, can be constructed by any person and, or, manufacture, with knowledge of the Heating and Air Conditioning Technical Field, by means of the following instructions;

a) a water supply system, must be assembled by a person with knowledge of the plumbing technical field which consists of a water pump, part 25A with a pressurization tank, assembled to deliver a constant supply of water from a water source to the present invention, via part(s) 25, to water pump, through water pump, to part(s) 25 to a water regulator device part 25B, via part(s) 25C to the present invention, b) a protective cover, U.S. Pat. No. 6,170,281, must be constructed per the requirements of said protective cover, which is the weather shield solar heat collector per reflector, by the same inventor, the evaporator coils, parts 20,21,22, and 23, should be mounted by means of attachment to the inner section of parts 1,2,3, and 4, in a position in-line with the air intake slots which are located on said parts 1,2,3, and 4, and are displayed in U.S. Pat. No. 6,170,281 and within this patent application on drawings of FIG. 1, FIG. 2, FIG. 3, and FIG. 4 and are duly labeled as Air Intake, c) to an Inlet or intake water supply piping system, must be assembled, beginning at the water source to the water pump, part 25A, through part 25B, via part 25C to the evaporator coil part 20, then through an easy access flexible hose part 24A, with threaded screw on per screw off connector, to water supply inlet piping part(s) 25C, via part 25C to part 21, then in turn to part 22, then to part 23, delivering a water supply via piping of part(s) 25C to the evaporator coils of part(s) 20,21, 22, and 23, d) an outlet or exit water supply piping system, must be assembled, beginning at the outlet end of part 21 (evaporator coil) via part(s) 25D, to the outlet end of part 22, via 25D, to the outlet end of part 23, via 25D to a flexible pipe, part 24B, via part 24B to the outlet end of part 20 (evaporator coil), then via part 25D through a water regulator part 25E, through 25E via part(s) 25D to a water disposal area, which can be, but is not limited to a sewer drain, creek, river, lake, pond, etc, e) all plumbing connections should be checked, to assure a water tight seal.

It will be understood that each of the elements described above, may also find a useful application in other types of construction, differing from the type previously mentioned, with the exception of the said weather shield and solar heat collector per reflector, which is a novel feature of the Thermal Energy Heat Exchanger, along with the unique placement of said elements.

The present invention has been illustrated and described as embodied in a weather shield and solar heat collector per reflector, with add-on, thermal energy heat exchanger and is unique by combination and location of it's parts, and is an air conditioning system, for, the said exterior unit, by means of the recovery and delivery of thermal energy.

What is claimed is:

1. A thermal energy heat exchanger system for a heat pump having an outdoor air cooled exterior unit having a fan comprising:

a protective cover enclosure having an inner chamber section sized to surround said outdoor air cooled exterior unit and having air intake and exit passageways to permit the ingress and egress of ambient air, a plurality of imperforate water coils positioned so as to surround said outdoor air cooled exterior unit and having means for attachment of said water coils to the inner chamber section of said protective cover enclosure, said protective cover enclosure having said air intake passageways and said water coils positioned such that ambient air drawn from outdoors by said exterior unit fan is placed in heat transfer relationship with said water coils prior to passing through said outdoor air cooled exterior unit, a water source connected to said water coils, means for pumping circulating water under controlled water pressure via an inlet water supply piping system to said water coils; and an outlet water disposal system connected to said water coils for removing water from said water coils.

2. The thermal energy heat exchanger system of claim 1 wherein the means for pumping is a water pump with a pressurization tank for delivering water from said water source through a water regulation device, an inlet water supply system, a flexible hose and said plurality of water coils.

3. The thermal energy heat exchanger system of claim 1 wherein said protective cover enclosure is a weather shield solar heat collector per reflector.

4. The thermal energy heat exchanger system of claim 1 wherein said outlet water disposal system comprises an outlet or water disposal piping that connected to said plurality of water coils through a flexible hose and a water regulation device.

5. The thermal energy heat exchanger system of claim 1 wherein said outlet water disposal system comprises a sewer drain, a creek, a river, a lake or a pond.

6. A thermal energy heat exchanger system for an air conditioning system having an outdoor air cooled exterior unit having a fan comprising:

a protective cover enclosure having an inner chamber section sized to surround said outdoor air cooled exterior unit and having air intake and exit passageways to permit the ingress and egress of ambient air, a plurality of imperforate water coils positioned so as to surround said outdoor air cooled exterior unit and having means for attachment of said water coils to the inner chamber section of said protective cover enclosure, said protective cover enclosure having said air intake passageways and said water coils positioned such that ambient air drawn from outdoors by said exterior unit fan is placed in heat transfer relationship with said water coils prior to passing through said outdoor air cooled exterior unit, a water source connected to said water coils, means for pumping circulating water under controlled water pressure via an inlet water supply piping system to said water coils; and an outlet water disposal system connected to said water coils for removing water from said water coils.

7. The thermal energy heat exchanger system of claim 6 wherein the means for pumping is a water pump with a pressurization tank for delivering water from said water source through a water regulation device, an inlet water supply system, a flexible hose and said plurality of water coils.

8. The thermal energy heat exchanger system of claim 6 wherein said protective cover enclosure is a weather shield solar heat collector per reflector.

9. The thermal energy heat exchanger system of claim 6 wherein said outlet water disposal system comprises an outlet or water disposal piping that connected to said plurality of water coils through a flexible hose and a water regulation device.

10. The thermal energy heat exchanger system of claim 6 wherein said outlet water disposal system comprises a sewer drain, a creek, a river, a lake or a pond.

* * * * *